United States Patent [19]
Kelton et al.

[11] Patent Number: 5,768,291
[45] Date of Patent: Jun. 16, 1998

[54] METHOD AND APPARATUS FOR ERROR MITIGATING A RECEIVED COMMUNICATION SIGNAL

[75] Inventors: James Robert Kelton, Oak Park; Phillip D. Rasky, Buffalo Grove, both of Ill.

[73] Assignee: Motorola, Inc., Schaumburg, Ill.

[21] Appl. No.: 366,063

[22] Filed: Dec. 29, 1994

[51] Int. Cl.$^6$ ........................................... H04L 1/20
[52] U.S. Cl. .................. 371/30; 371/31; 375/331; 375/346
[58] Field of Search .................. 371/31, 30; 375/331, 375/346

[56] References Cited

U.S. PATENT DOCUMENTS

| | | | |
|---|---|---|---|
| 5,113,400 | 5/1992 | Gould et al. | 371/43 |
| 5,309,443 | 5/1994 | Schorman | 371/5.5 |
| 5,432,778 | 7/1995 | Minde et al. | 370/95.3 |
| 5,502,713 | 3/1996 | Lagerqvist et al. | 370/17 |
| 5,550,837 | 8/1996 | Chang | 371/5.5 |
| 5,557,639 | 9/1996 | Heikkila et al. | 375/224 |
| 5,572,622 | 11/1996 | Wigren et al. | 395/2.37 |

OTHER PUBLICATIONS

Matsumoto, et al., "Enhancement of Speech Coding for Digital Cordless Telephone Systems", Fourth International Symposium on Personal Indoor and Mobile Radio Communications (PIMRC), Sep. 11, 1993, pp. 618–621.

Kubota, et al., "Improved ADPCM Voice Transmission Employing Click Noise Detection Scheme for TDMA–TDD Systems", Fourth International Symposium on Personal Indoor and Mobile Radio Communications (PIMRC), Sep. 11, 1993, pp. 613–617.

Nakamura, et al., "Improved ADPCM Voice Transmission for TDMA–TDD Systems", Proceedings of the 43rd Vehicular Technology Conference, 1993, pp. 301–304.

Varma et al., "Performance of 32 kb/s ADPCM in Frame Erasures", 1994 Conference on Vehicular Technology, pp. 1291–1295, Mar. 1994.

Fukasawa et al., "Speech Cocing Scheme for Personal Communications Under Radio Interference Noises", 1994 Conference on Vehicular Technology, pp. 1724–1727, Mar. 1994.

*Primary Examiner*—Stephen M. Baker
*Attorney, Agent, or Firm*—Kevin A. Buford

[57] ABSTRACT

A method and apparatus for mitigating error in a received communications signal includes an error mitigation unit (245) which receives and performs mitigation based on an error indication (e.g., a CRC) and a quality indication (QI). The error mitigation unit may include a magnitude adjuster (220) for adjusting the input signal value (e.g., an ADPCM nibble) when the QI is less than a threshold, and a soft correction unit (240) for, when the QI is above the threshold, either soft correcting nibble magnitudes or muting selective nibbles based on further signal information such as differential phase.

23 Claims, 7 Drawing Sheets

REGION 1, MSB IS MORE LIKELY CORRECT THAN LSB

REGION 2, MSB IS MORE LIKELY CORRECT THAN LSB 5,768,291

1

METHOD AND APPARATUS FOR ERROR MITIGATING A RECEIVED COMMUNICATION SIGNAL

FIELD OF THE INVENTION

The present invention relates generally to communications systems and more particularly to a system for error mitigation of a received communication signal.

BACKGROUND OF THE INVENTION

A key problem in all communication systems is how to minimize any degradation or error in a signal while in the communication channel. This problem is particularly significant in wireless communication systems, like cellular radio and PCS (person communication service) systems, where factors such as multipath fading, shadowing effects, other subscriber and environmental interference, and the like can contribute to the signal degradation. As a result, numerous solutions have been advanced to reduce the likelihood of error (e.g., improved modulation schemes) or to detect or correct the error (e.g., using CRC (cyclic redundancy check) or FEC (forward error correction) coding) at the receiver.

In order to minimize cost and system complexity many current (e.g., CT-2, the second generation cordless telephone) and proposed (e.g., some PCS) systems have adopted less error-tolerant approaches such as CCITT (International Telephone and Telegraph Consultative Committee) standard G.721 Adaptive Differential Pulse Code Modulation (ADPCM) speech coding. The ADPCM standard was originally designed to be robust against random bit error rates (BERs) up to $10^{-3}$, a reasonable rate for wireline transmissions. However, in wireless communications much higher BERs occur, necessitating additional error mitigation schemes. The most common approach to mitigating error has been to set all input bits to zero in an indicated corrupted sequence. This approach mutes the entire signal for the duration of the sequence, thus typically improving audio output quality over a non-mitigated signal. However, this approach is limited by the error detection method employed, and often introduces further degradation due to the muting process. For example, when a CRC error indication is given for a frame, there is no distinction between minor (i.e., single bit or nibble) or more serious (i.e., burst) errors. Thus, an entire frame could end up being muted even though only one bit was in error. Moreover, because the ADPCM decoder's output is based on both the present and prior input samples, setting the input to zero will create transients in the ADPCM output for some time after the muting is removed. These transients may appear in the form of loud "clicks" or "pops" in the audio output, and these clicks or pops are sometimes more annoying than the unmitigated output would have been.

In order to further reduce the unwanted clicks or pops several post-decoding schemes have been proposed. For example, S. Kubota et al. in "Improved ADPCM Voice Transmission Employing Click Noise Detection Scheme for TDMA-TDD Systems,"Fourth International Symposium on Personal Indoor and Mobile Radio Communications (PIMRC), Sep. 11, 1993, propose a system in which the decoded PCM signal is measured for characteristics more indicative of click noise, like large signal level differences or dynamic range overflow. A buffer holds the last PCM frame/burst decoded without error. Upon detection of a click characteristic, the current burst is suppressed. In a related article by O. Nakamura et al., "Improved ADPCM Voice Transmission for TDMA-TDD Systems," Proceedings of the 43rd Vehicular Technology Conference, 1993, a similar system is proposed, except a buffer is also used to hold the last PCM frame/burst decoded without error. Upon detection of a click characteristic, the current burst is replaced by the buffered burst. While these articles report some improvement over simple muting each suffer disadvantages.

The first system suffers from both problems of muting—a potentially annoying period of silence and subsequent transient noise. The second system requires replacement of an entire burst, leaving the ADPCM channel memory unaffected (i.e., the corrupted nibbles will continue to affect the ADPCM output after PCM click suppression has ceased) and is accomplished at the expense of increased post-decoding complexities and delay. Further, many systems physically separate the pre- and post-ADPCM decoding circuitry (such as some PCS systems in which the ADPCM and post-decoding stages are located at the radio port control unit (RPCU), physically separate from where the channel information is determined, at the radio port (RP)), and any requirement for channel information at the ADPCM stage would require an undesirable increase in information being communicated between the different circuit elements.

There remains therefore a need for an improved system for mitigating errors in received coded signals, while minimizing system complexity and cost and decoding delays.

DETAILED DESCRIPTION OF AN EMBODIMENT

The need for an improved error mitigation approach, unsatisfied by the prior art, is met by an error mitigation system according to the present invention. Unlike the prior art, the present invention provides an approach for error mitigating word/nibble length signal portions based on signal quality and error indications, and includes adaptive features for responding to both bursty and more isolated errors. This novel error mitigation approach is processed substantially prior to signal decoding, and in many systems can be readily implemented utilizing error/quality measurements already available.

Figure 1:
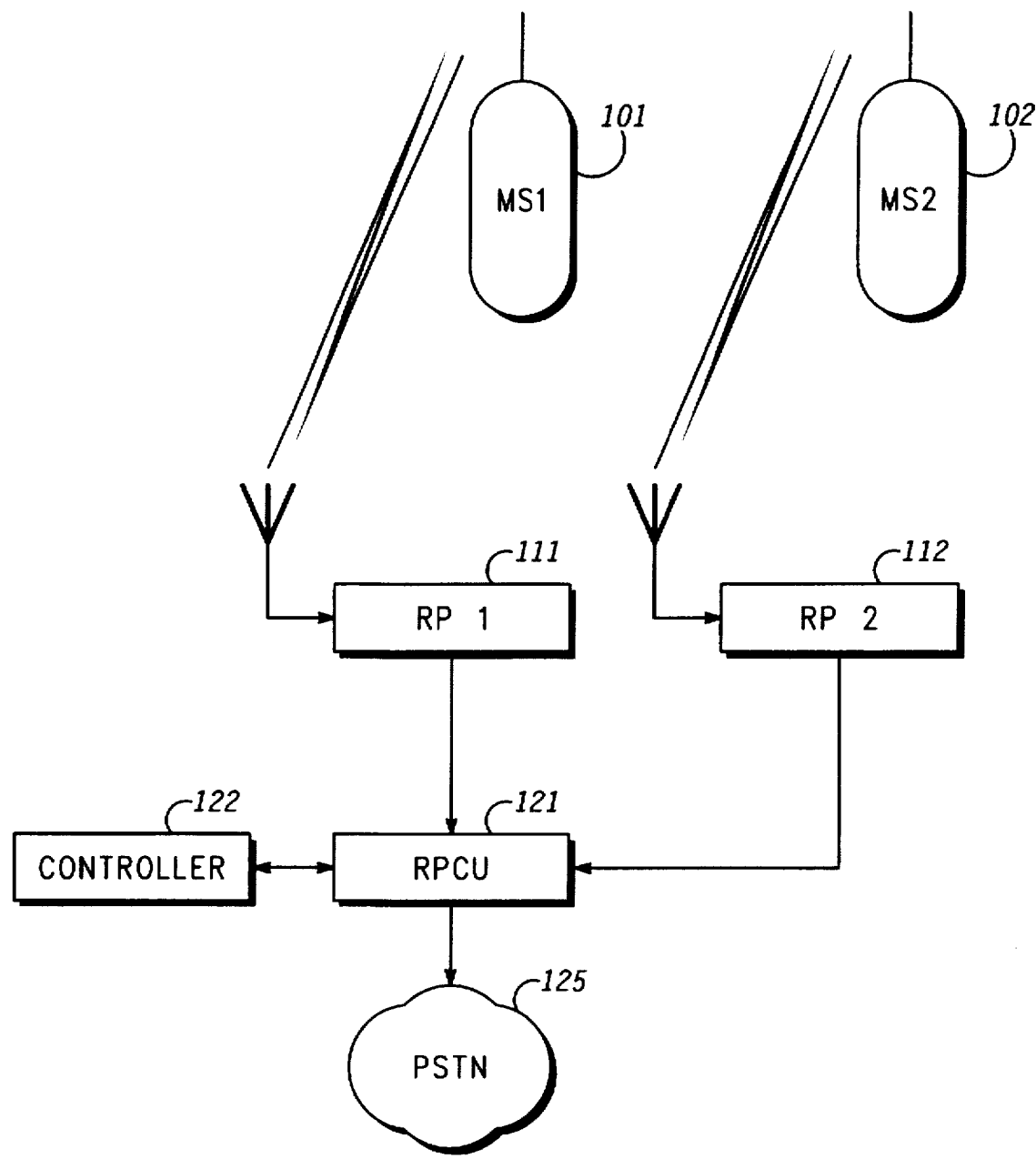
FIG. 1 generally depicts a communication system in which the present invention can be utilized.

FIG. 1 shows one such embodiment of a communication system in which the invention may be used. This system is a two-way radio communication system such as a PCS system. In such a PCS system, a plurality of subscribers 101, 102 can communicate via any one of a number of radio ports (RPs) 111, 112, depending on which radio port is providing coverage for the region in which the subscriber is located. Several of the radio ports are in turn connected to a common radio port control unit (RPCU) 121, which in turn is connected to a communication network such as public switched telephone network (PSTN) 125. A controller (e.g., an access/mobility manager) 122 is used to control RPCU 121 and a number of other RPCUs via T1 or similar communication links (not shown).

One such PCS system in which the invention may be used is the proposed Personal Access Communication System (PACS) based microcellular system. The PACS system is a time division multiple access (TDMA) system using π/4 DQPSK (differential quaternary phase shift keyed) modulation with ADPCM speech coding and a CRC-based error detection. In the differentially encoded π/4 DQPSK modulation scheme, information is transmitted in the phase transitions between successive symbols, with four valid phase transitions used to represent two bits per transmitted symbol. The demodulator of a PACS receiver removes π/4 radians from the differential phase stream, effectively mapping the π/4 DQPSK to DQPSK. After subtracting the π/4 radians from each transition, the valid constellation points in the signal space are 0, π/2, and 3π/2 radians, representing the bit pairs 00, 01, 11 and (shown as constellation points 300, 301, 311 and 310, respectively, in FIG. 3). The demodulator extracts the absolute phase of the incoming signal and subtracts the phase value of successive symbols to determine the bit pair which was transmitted.

Figure 3:
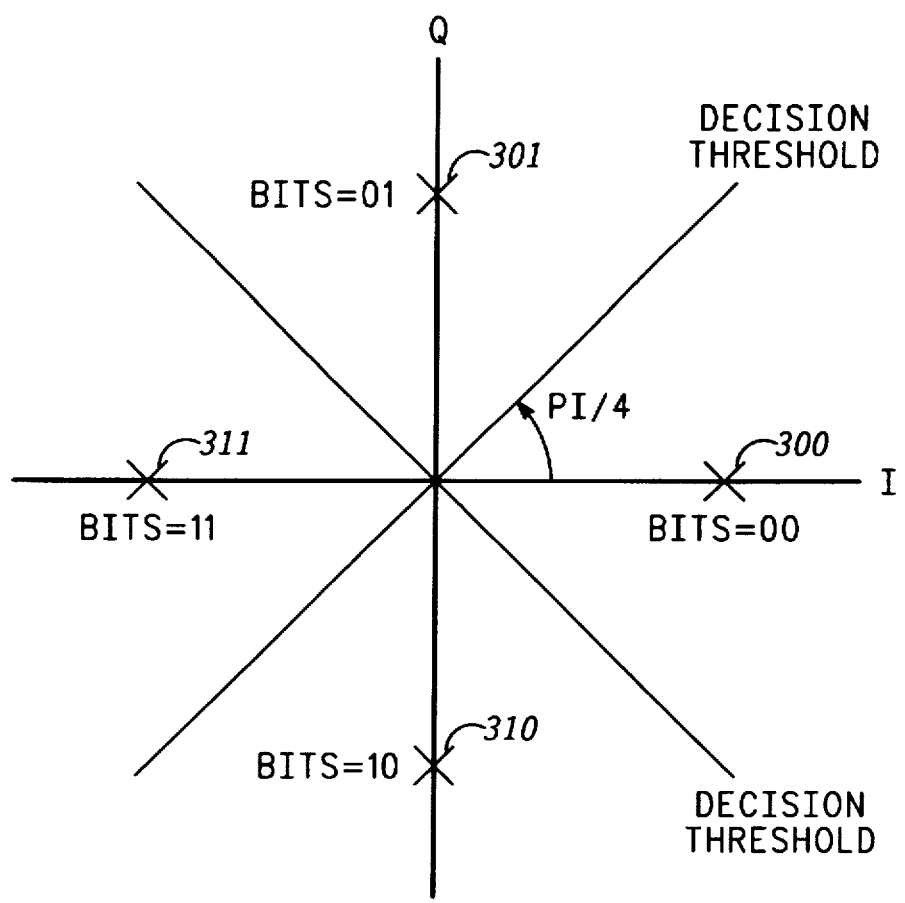
FIG. 3 illustrates a signal space and constellation points for a signal being received by the receiver of FIG. 2.

However, due to channel fading or interference, the received differential phase values of the incoming signal will not necessarily fall on one of the valid phase transitions/constellation points. In order to assign a bit pair to each transition, the demodulator will pick the closest valid transition to the differential phase value received and map this transition to a bit pair. When the received phase transition differs from the transmitted phase transition by more than π/4, the demodulator will assign the wrong valid phase transition and a bit error will result. It should also be noted that some PACS systems use Gray coding of the bit pairs, so adjacent valid phase transitions represent bit pairs which differ in only one position. FIG. 3 shows the signal space/IQ (in-phase/quadrature phase) plane with the hard decision thresholds 305, 306 used by the demodulator.

It is also worth noting that the PACS TDMA system uses a 2.5 ms (millisecond) structure containing 8 time slots. Each time slot consists of 120 bits, 90 of which are protected by a (105,90) CRC code. Of these 90 bits, 80 bits (called bearer bits) are used to carry 20 4 bit ($a_3$-$a_0$) G.721 ADPCM nibbles representing 2.5 ms of speech. These nibbles are aligned such that the first bit of the 80 bearer bits is the MSB of the first ADPCM nibble. Further, these nibbles are aligned such that the first two bits of an ADPCM nibble are represented by a single symbol. The G.721 standard calls for the use of 4 bit nibbles, which represent the prediction error in sign magnitude form. One nibble is encoded for each audio sample at a sampling rate of 8 kHz (kilohertz). The MSB of each nibble ($a_3$,$a_2$) is a sign bit, with the remaining three bits used to represent the magnitude of the prediction error. The hexadecimal value F is used to represent 0 and the hexadecimal value 0 is not used.

Figure 2:
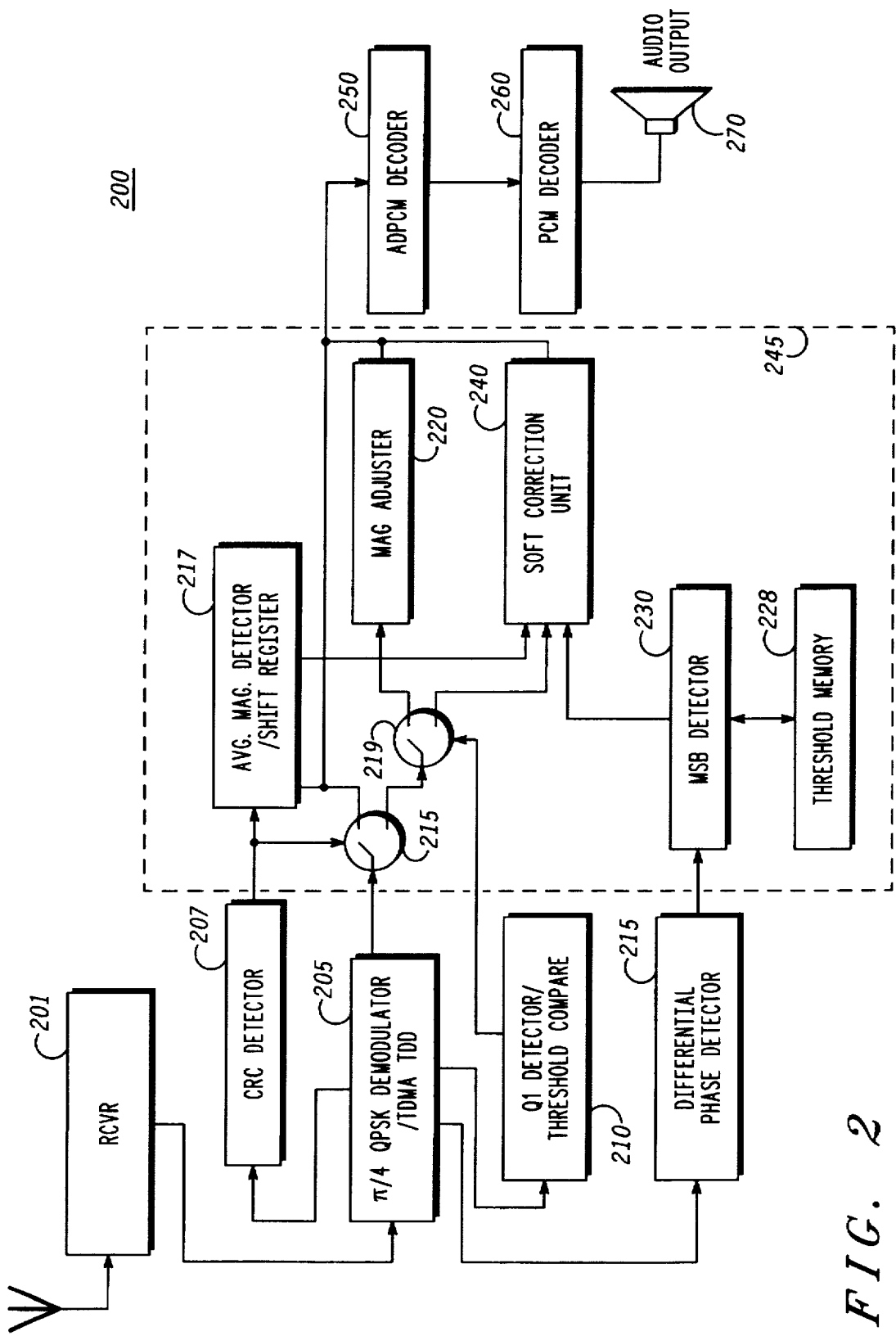
FIG. 2 is a block diagram illustrating an embodiment of a communications receiver in accordance with the invention.

Turning to FIG. 2, a first embodiment of a communications receiver 200 according to the invention is shown. An ADPCM coded voice communications signal is received via receiver front end input 201, which in this embodiment is a π/4 DQPSK modulated ADPCM coded signal. The signal is demodulated in demodulator 205 so as to output a demodulated coded voice signal; in this case the signal is a demodulated ADPCM signal including frames each having 20 ADPCM nibbles, each nibble being a group of two 2-bit symbols. In addition to the demodulated ADPCM signal, the demodulator also has outputs to a CRC or error detector 207, a differential phase detector 225 and a quality indication (QI) detector 210. The CRC detector 207 looks for an error indication in the check sum bits of the CRC coded frame, and outputs an error indication signal indicative of whether or not error has been detected. The quality indication detector 210 typically determines a quality indication (QI) based on a monotonic function of channel quality. One such measure would be the inverse of the average distance of all the information bearing symbols of the frame/time slot to the closest constellation point (e.g., the position of the vector sum of all symbol values when all are adjusted so as to be proximate the 00 constellation point 300). This QI is compared to a predetermined threshold value, and a QI signal is outputted indicative of whether the average is greater than the threshold or not. An alternative measure of QI could be the carrier to interference and noise (C/I+N) ratio (a skilled artisan will appreciate that whether or not the inverse is used is for sake of convention, to permit consistency in referring to soft correction operations based on QI being greater than a threshold; whether the operation is based on being greater or greater than a threshold depends on the measure of QI used, and different measures, including those based on non-monotonic functions, from those described may be used for either QI). The differential phase detector 225 looks at the differential phase values from symbol to symbol of the DQPSK signal (i.e., already π/4 phase rotated), mapping onto the signal spaces shown in FIGS. 3 and 4.

The demodulated ADPCM signal, a stream of 20 nibbles, is outputted to switch 215 of error mitigator 245. Switch 215 operates in response to the CRC error indication signal to route the nibbles to the ADPCM decoder 250 when no error is detected, and to a further switch 219 when an error is detected. Thus, no error mitigation is performed in the absence of a detected error condition. Switch 219 in turn operates in response to the QI signal to route the nibbles to soft correction unit 240 when the QI is greater than the threshold and otherwise to bit value or magnitude adjuster 220. The error mitigated signal output of error mitigator 245 is then processed by ADPCM decoder 250. The resultant PCM bit stream is further decoded by PCM decoder 260 and converted to an audio output via speaker 270.

Figure 4:
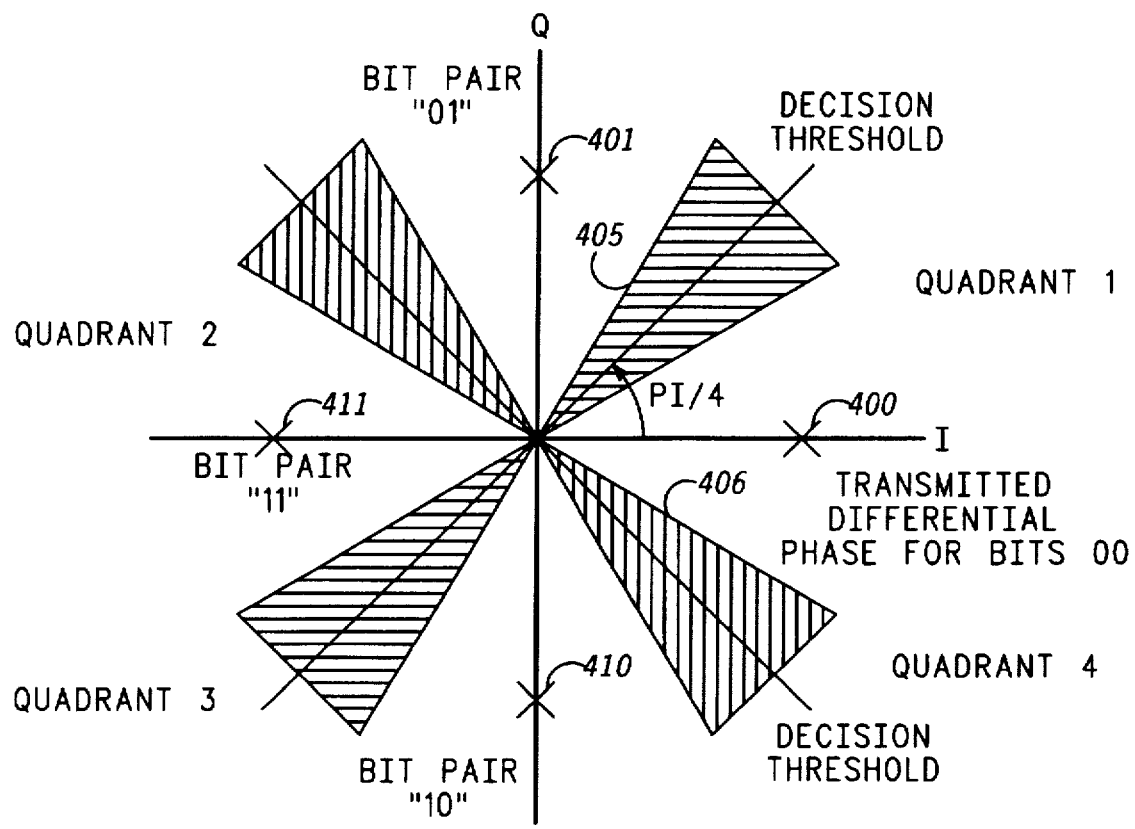
FIG. 4 illustrates a the signal space of FIG. 3 with threshold regions in accordance with the invention.
Figure 4:
Figure 4:
Figure 5:
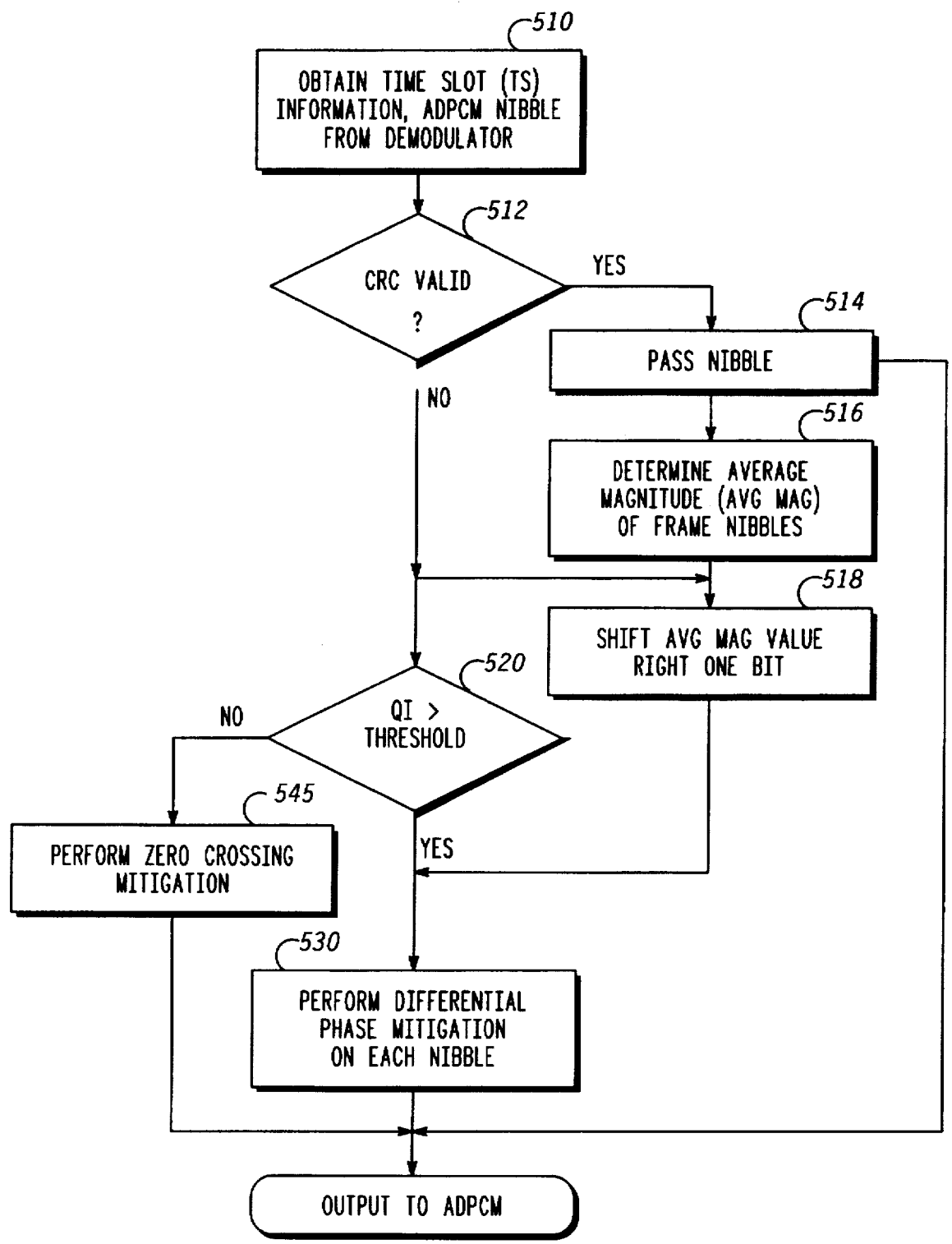
FIG. 5 is a flow chart illustrating the steps for error mitigating the signal being received by the receiver of FIG. 2.
Figure 6:
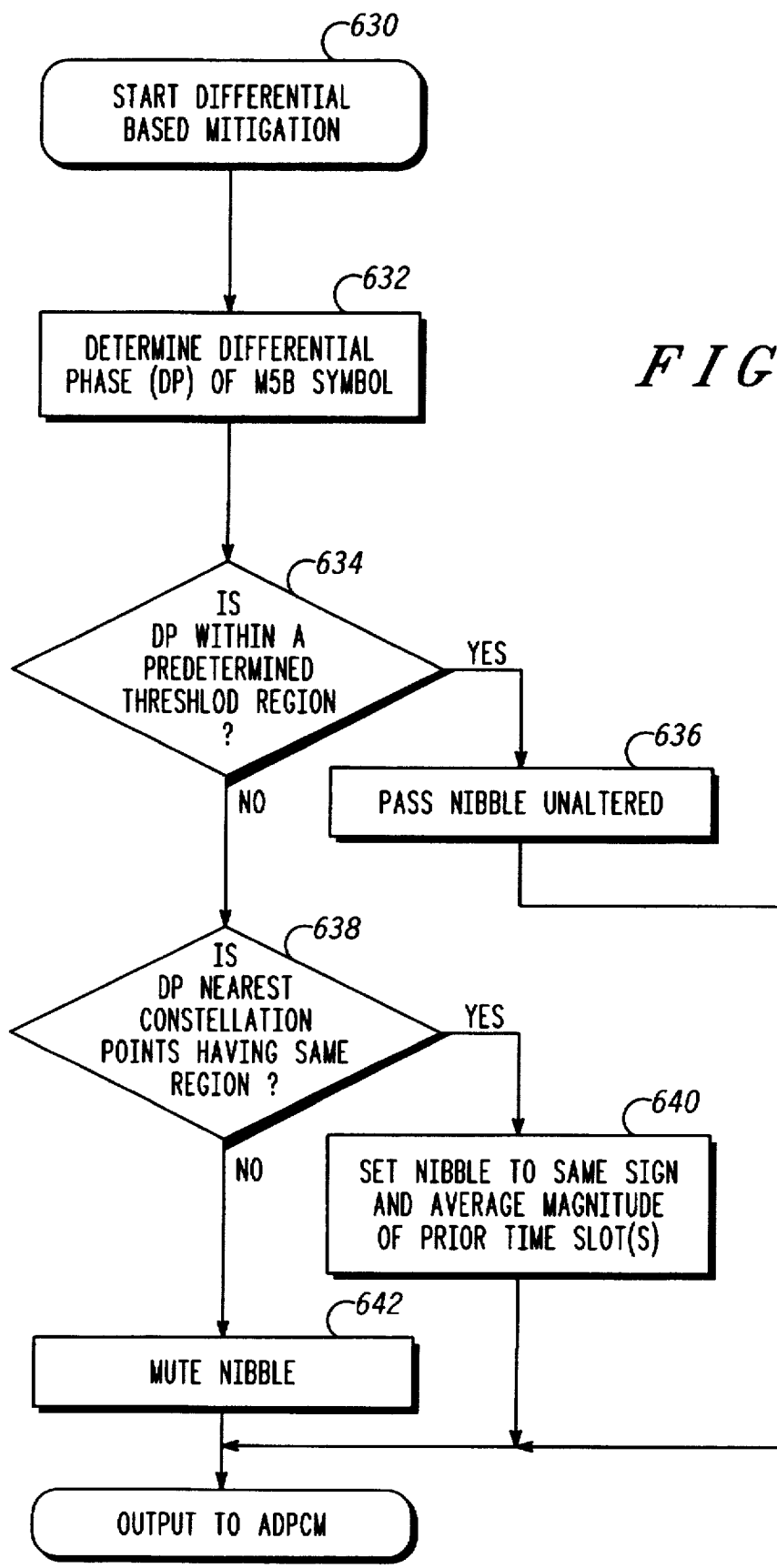
FIG. 6 is a flow chart illustrating further steps of error mitigation according to the step of block 530 of FIG. 5.

The operation of the error mitigator 245 can be better understood now by additional reference to FIGS. 4 through 6. In this embodiment the CRC error indication, the QI and the differential phase values are all derived from the same time slot. In practice, one time slot per frame would be used to provide this data, which means that the CRC and QI information is obtained (step 510) every 2.5 ms. When the CRC is valid, all nibbles of the frame are passed unaltered to the ADPCM decoder 250 (steps 512–514). Additionally, an average magnitude of the nibbles in this frame is determined via average magnitude detector 217, for later use as a default magnitude in the soft correction unit 240 (step 516). This magnitude is replaced each time a new "good" frame is received. In order to minimize the effect of extended (i.e., multiframe) fades, the average magnitude is shifted one bit (i.e., divided in half) for each sequential "bad" frame indicated via the CRC error indication (step 518).

When the CRC indicates an error in the frame, the nibbles are passed to switch 219 for appropriate error mitigation by one of two or more error mitigation processes (e.g., first and second error mitigation processes of steps 530 and 545 in this embodiment; a skilled artisan will recognize any number of additional processes may be implemented if desired, e.g. by looking at several threshold levels). When the QI is greater than the predetermined threshold, each nibble is passed to soft correction unit 240 for individual error mitigation (steps 520, 530). The next steps are taken based upon the differential phase output from differential phase detector 225 to MSB (most significant bit, or sign/threshold) detector 230. MSB detector 230 first extracts the differential phase value (typically 8 bits long, $b_7$–$b_0$) of the two MSBs (i.e., $a_3,a_2$, the most significant symbol) of the nibble (steps 630, 632). A determination is then made whether the differential phase value magnitude, i.e., the 6LSBs (least significant bits) $b_5$–$b_0$ of the differential phase, are within phase transition threshold regions 405, 406 by comparing $b_5$–$b_0$ with a threshold stored in threshold memory 228 (step 634); if not, the nibble is passed unaltered, as being more likely capable of correct mapping to the closest constellation point (i.e., one of valid bit pairs 400, 401, 411 and 410) (step 636).

If, on the other hand, the differential phase value magnitude is within the threshold region, a further determination is made of whether the nearest constellation points to the MSBs have the same sign (i.e., the most significant) value (step 638). In a DQPSK modulation scheme this can be implemented by simply XORing the 2 MSBs $a_3,a_2$ (see XOR block 734 of FIG. 7) to determine the quadrant of the signal space in which the 2 MSBs are located; in other words, when either quadrant 1 or 3 are indicated, the symbol is known to be within threshold 405 and amenable to further mitigation. In this case, the MSB of the nibble is preserved and the magnitude (i.e., the remaining bits) is set to the average (default) magnitude from average magnitude detector 217 (step 638, 640). If the 2 MSBs are instead determined to be within quadrants 2 or 4, there is a greater likelihood of error present so the nibble is muted, typically by setting its value to FH ("F"hexadecimal) (step 642). Alternatively, when the differential phase value magnitude is within the threshold region, one could simplify the processing by just muting the nibble.

Finally, if the QI is less than the threshold, this is typically indicative of very little valid information being present. In this case, a zero-crossing algorithm is appropriate, since very little reliance is placed on the received information for acceptable output. The best approach found for such zero crossing algorithm has been to replace, via magnitude adjuster 220, the values of all nibbles of the frame depending on the value of the MSB or sign bit. Thus, when the MSB is 0 (binary) the nibble would be set to 3H (hex), while a MSB of 1 would cause the nibble to be set to CH. As a consequence, the values 0010 0001 1111 1110 (i.e., 21FE (hex)) would be adjusted to 0011 0011 1100 1100 (i.e., 33CC (hex)). The advantage of this algorithm over muting is that it minimizes transients in the ADPCM decoder output. One skilled in the art will appreciate that other algorithms or simple muting may also be advantageously employed. Thus, for example, one could mitigate similarly to the above zero-crossing algorithm but by retaining all FH values (i.e., so the above series results in 33FC (hex)), or by 30 using an algorithm in which all positive values are reduced by 1, and negative values by –1, or some adaptive amount.

Figure 7:
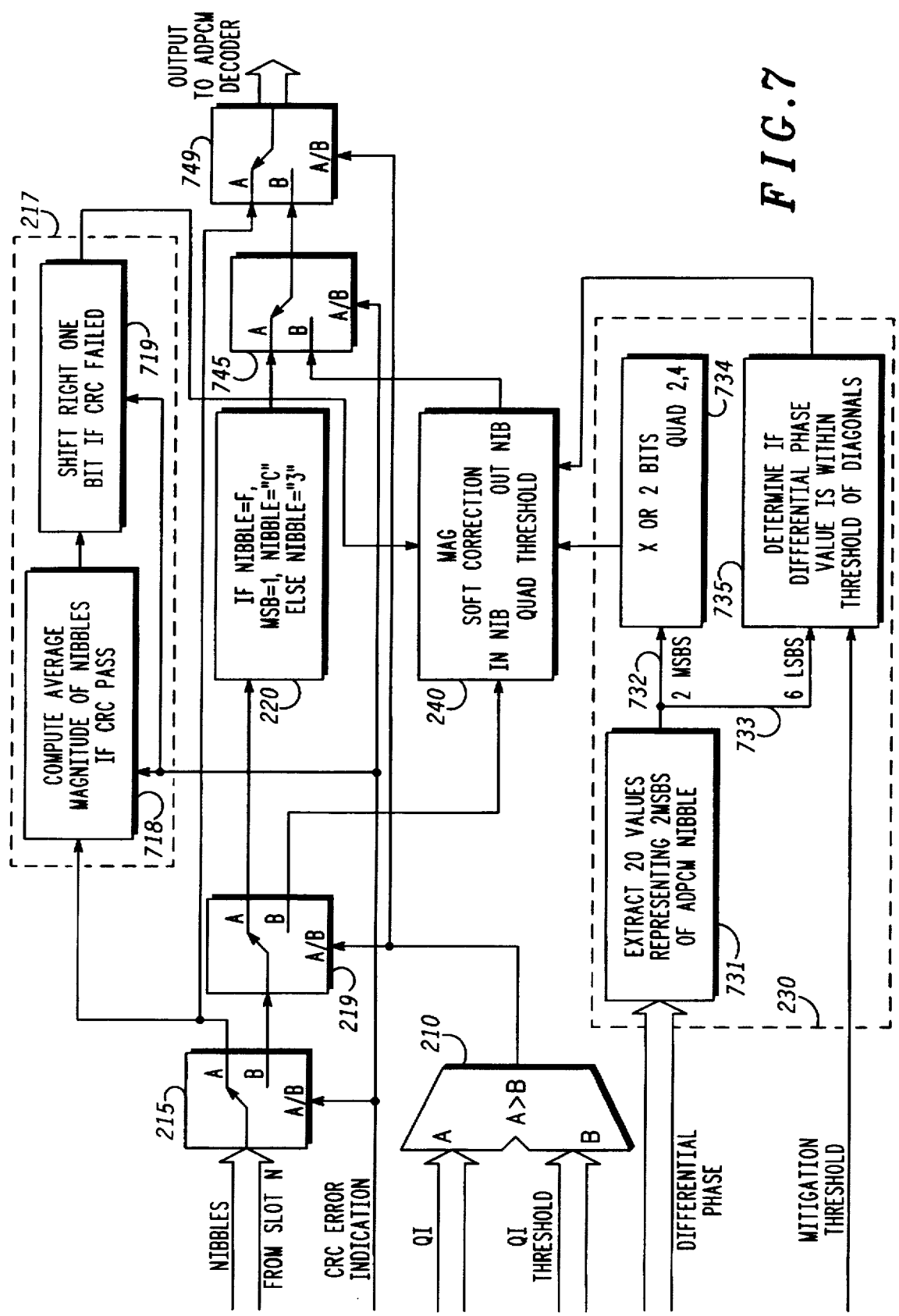
FIG. 7 is a functional block diagram of an error mitigation circuitry or program in accordance with the invention.

The operation of the error mitigator can be further understood by examining the mapping of the differential phase to symbols, with additional reference to FIGS. 4 and 7. It should be noted that FIG. 7 is a functional block diagram corresponding to the apparatus block diagram of FIG. 2, with same numbered blocks corresponding to similar functionality/hardware. While the circuitry of the embodiment of FIG. 2 has been logically separated, a skilled artisan will appreciate that the actual implementation of these functions may be accomplished in a variety of different manners including, but not limited to, properly programming a digital signal processor (DSP), coupling discrete components together, and using a combination of one or more application specific integrated circuits (ASICs). It should thus be understood that the description of these embodiments is intended for illustration and not a limitation on the scope of the invention.

As noted above, the constellation of FIG. 4 is identical to that of a DQPSK signal, the $\pi/4$ phase shift having been removed by demodulator 205. Because the use of differential phase is predicated on a value of QI which indicates a relatively good channel, smaller values of error in the differential phase are more probable than large errors. Therefore, the received differential phase value is more likely to be closer to the transmitted differential phase value than further away. Because of this distribution, most errors in the received symbols will be the result of differential phase values close to $\pi/4$ radians. A differential phase error of $\pi/2$ radians is assumed to be considerably less likely. Therefore, one may generally assume that the values of differential phase which are near an ideal transmitted differential phase value have been decoded correctly and should be sent to the ADPCM decoder 250 unaltered.

However, if the differential phase error is near $\pi/4$ radians, as indicated by regions 405 and 406 of FIG. 4, the received differential phase is almost equidistant from two valid phase transitions. In this case, the probability that the symbol was decoded in error approaches 0.5. Further, it is much more probable that the actual transmitted phase was one of the two nearby values and not one of the two points which are $3\pi/4$ radians removed from the decoded differential phase. Under this assumption, received differential phase values falling in region 405 of FIG. 4 most probably represent the transmission of one of two symbols, both of which possess the same MSB. Conversely, received differential phase values in region 406 most probably represent transmitted symbols with a differing MSB. When the MSB is correct, the sign of the ADPCM nibble can be correctly determined, thus greatly reducing the magnitude of the error caused by the erroneous symbol. On the other hand, when the sign of the ADPCM nibble is not known with confidence, little advantage can be gained by attempting to predict the actual transmitted value and the best action appears to be muting the nibble by setting it to FH.

One approach for determining the sign bit is shown in the functional blocks of sign/threshold detector 230 of FIG. 7. An 8 bit differential phase value (in twos complement) is received for each of the 40 symbols of the frame, with the value 7FH (positive full scale) mapping to a received phase of slightly less than $\pi$ radians and 80H (negative full scale) representing $-\pi$ radians. In input block 731 the two MSBs (i.e., $a_3,a_2$—the symbol having the sign bit) of each nibble are extracted, with the 2 MSBs ($b_7,b_6$) 732 of each symbol differential phase value being sent to block 734 and the 6 LSBs ($b_5$–$b_0$) 733 being sent to block 735. The MSBs 732 are XORed (exclusive-ORed, in block 734—e.g., via a MSB value detector) to determine whether the symbol is mapped into the first and third quadrants (containing region 405 of FIG. 4) or the second and fourth quadrants (containing region 406). The LSBs 733 are compared with a mitigation threshold magnitude (in block 735, e.g., a phase magnitude detector) to determine whether the symbol magnitude brings it within either of threshold regions 405 or 406. Based on the outputs from blocks 734 and 735 the soft correction unit 240 determines whether to adjust the magnitude of the nibble, or mute it. If the determination is made to adjust the magnitude, the sign bit is retained while the remaining bits of the nibble are replaced with the average magnitude determined from the preceding "good" frame (block 718), divided by the number of intervening frames in which the CRC failed (block 719; this drives the mitigation to mute over long fades). Switching blocks 745 and 749 operate the same as blocks 215 and 219, connecting the appropriate paths for output to the ADPCM decoder 250.

Again, it should be noted that the blocks of FIG. 7 can be implemented in either software or hardware. By way of example, block 718 may be implemented via a 7 bit accumulator, followed by a shift register (block 719). Block 736 could be implemented as an XOR gate, with block 735 being accomplished with two modified 6 bit comparators, and block 240 with two 3 bit multiplexers and 3 XOR gates. In such a configuration the CRC error indication and QI are updated at the beginning of each frame, with switching blocks 215, 219, 745 and 749 operating at the frame rate of 400 Hertz (Hz) and the remaining blocks operating at the ADPCM sample rate of 8 KHz. One skilled in the art will understand how to implement the features of the present invention as hardware and/or software as appropriate to the particular system being used.

The above embodiment can be readily implemented, since all input signals except the two threshold signals are available from the PACS demodulator. By utilizing these inputs the present invention permits an improved mitigation without the need for frame muting or post-decoding circuitry. When a QI indicates soft correction is appropriate, an improved estimate of the correct ADPCM nibble is possible via the soft correction unit/algorithm 240. To the extent muting is done by the soft correction unit 240, it is done on a nibble by nibble basis, thus avoiding the sizable transients resulting from a frame mute. When the QI indicates little probability of correcting the frame, an improved zero-crossing or similar algorithm can be used for all nibbles within the corrupted frame, again reducing any transient problems and avoiding the need for further post-decoding mitigation. As a result, an improved signal with minimal additional cost in circuitry or processing is achieved.

While the above embodiment illustrates one preferred implementation for error mitigation in a wireless communications system, it should be understood that the invention also has application to any other type of communication system in which error mitigation is useful. Thus, while it has particular application to PCS and CT-2 systems using ADPCM coding, it may be used in any number of systems, including those that use a different form of coding and those that are not wireless, and it will be apparent to one skilled in the art that various modifications and changes can be made without departing from the spirit and the scope of the invention. Therefore, the scope of the invention should be understood in view of the claims below.

We claim:

1. A method for improving quality of a demodulated coded voice signal comprising:
   a) determining an error indication of whether error is present in the signal;
   b) determining a quality indication (QI) of the signal; and
   c) error mitigating the signal when the error indication is indicative of error in the signal and the QI is greater than a predetermined threshold wherein the step of error mitigating comprises determining a differential phase of each symbol of a first group of symbols of the signal, determining whether a magnitude of the differential phase of the first group is within a threshold region, determining plural closest constellation points to a first symbol containing a most significant bit (MSB) of the first group, and when the magnitude of the differential phase is within the threshold region further error mitigating all remaining bits of the first group.

2. The method of claim 1 wherein step a comprises determining if a cyclic redundancy check (CRC) error is detected.

3. The method of claim 1 further comprising the step of determining whether the MSB has a same value when mapped to each of the plural closest constellation points and preserving a magnitude of the MSB based on the determination.

4. The method of claim 1 wherein the step of error mitigating the signal in step c comprises:
   i) determining a differential phase of each symbol of a first group of symbols of the signal;
   ii) determining whether a magnitude of the differential phase of the first group is within a threshold region;
   iii) determining plural closest constellation points to a first symbol containing a most significant bit (MSB) of the first group, and determining whether the MSB has a same value when mapped to each of the plural closest constellation points; and
   iv) when the magnitude of the differential phase is within the threshold region and the MSB has the same value when mapped to each of the plural closest constellation points, retaining the MSB and further error mitigating all remaining bits of the first group.

5. The method of claim 4, wherein the signal is demodulated from a π/4 DQPSK modulated, ADPCM coded signal, the first group of symbols is a first ADPCM nibble, the MSB is a sign bit of the first nibble, step a further comprises determining an error indication of a first frame of the signal, the first frame containing the first ADPCM nibble, and the step of further error mitigating comprises:
   determining an average magnitude of each nibble of a further frame which is a most recent frame prior to the first frame having an error indication indicative of no error, and dividing the average magnitude by $2^n$ (where n is a number of frames between the first frame and the further frame) to obtain a default magnitude;
   the remaining bits of the first nibble with the default magnitude.

6. The method of claim 1 wherein the signal is demodulated from a π/4 differential quaternary phase shift keyed (DQPSK) modulated, adaptive differential pulse code modulation (ADPCM) coded signal, and the QI is determined for at least a first frame of the signal having plural nibbles.

7. The method of claim 6 wherein the QI is determined by determining a carrier to interference and noise (C/I+N) ratio of the at least first frame.

8. The method of claim 6 further comprising the step:
   d) adjusting the plural nibbles to at least a first predetermined value when the QI is less than the predetermined threshold.

9. The method of claim 8 wherein each of the plural nibbles contains plural ADPCM-encoded bits in hexadecimal format, and step d comprises substituting a value of "3" for each bit having a hexadecimal value in the range "1" through "7" and substituting a value of "C" for each bit having a hexadecimal value in the range "8" through "E".

10. An apparatus for improving quality of a demodulated coded voice signal comprising:
    a) error indication means for determining an error indication of whether error is present in the signal;
    b) quality indication means for determining a quality indication (QI) of the signal; and c) error mitigating means for error mitigating the signal when the error indication is indicative of error in the signal and the QI is greater than a predetermined threshold wherein the step of error mitigating comprises determining a differential phase of each symbol of a first group of symbols of the signal, determining whether a magnitude of the differential phase of the first group is within a threshold region, determining plural closest constellation points to a first symbol containing a most significant bit (MSB) of the first group, and when the magnitude of the differential phase is within the threshold region further error mitigating all remaining bits of the first group.

11. The apparatus of claim 10 wherein the error indication means is further operable for determining if a CRC error is detected.

12. The method of claim 10 further comprising the step of determining whether the MSB has a same value when mapped to each of the plural closest constellation points and preserving a magnitude of the MSB based on the determination.

13. The apparatus of claim 10 wherein error mitigating means comprises:

i) means for determining a differential phase of each symbol of a first group of symbols of the signal;

ii) means for determining whether a magnitude of the differential phase of the first group is within a threshold region;

iii) means for determining plural closest constellation points to a first symbol containing a most significant bit (MSB) of the first group, and for determining whether the MSB has a same value when mapped to each of the plural closest constellation points; and iv) means for retaining the MSB and further error mitigating all remaining bits of the first group when the magnitude of the differential phase is within the threshold region and the MSB has the same value when mapped to each of the plural closest constellation points.

14. The apparatus of claim 13, wherein the signal is demodulated from a π/4 DQPSK modulated, ADPCM coded signal, the first group of symbols is a first ADPCM nibble, the MSB is a sign bit of the first nibble, the error indication means is further operable for determining an error indication of a first frame of the signal, the first frame containing the first ADPCM nibble, and means for retaining and further error mitigating comprises:

means for determining an average magnitude of each nibble of a further frame which is a most recent frame prior to the first frame having an error indication indicative of no error, and dividing the average magnitude by $2_n$ (where n is a number of frames between the first frame and the further frame) to obtain a default magnitude; and means for replacing the remaining bits of the first nibble with the default magnitude.

15. The apparatus of claim 10 wherein the signal is demodulated from a π/4 DQPSK modulated, ADPCM coded signal, and the quality indication means is operable for determining QI for at least a first frame of the signal having plural nibbles.

16. The apparatus of claim 15 wherein the quality indication means is further operable for determining the QI by determining a carrier to interference and noise (C/I+N) ratio of the at least first frame.

17. The apparatus of claim 15 further comprising:

d) means for adjusting the plural nibbles to at least a first predetermined value when the QI is less than the predetermined threshold.

18. The apparatus of claim 17 wherein each of the plural nibbles contains plural ADPCM-encoded bits in hexadecimal format, and the means for adjusting is further operable for replacing each bit based on a bit value of each said bit as adjusted by a zero-crossing algorithm.

19. An improved communications receiver for error mitigating ADPCM coded voice communications comprising:

a) an input coupled to a demodulator operable for outputting a demodulated ADPCM signal;

b) an error detector coupled to the demodulator, operable for outputting an error indication signal indicative of whether error is present in the signal;

c) a quality indication detector coupled to the demodulator, operable for outputting a quality indication (QI) signal;

d) an error mitigator coupled to the demodulator, error detector and quality indication detector, operable for error mitigating the demodulated ADPCM signal in response to the error indicating signal being indicative of error in the signal and the QI signal being indicative of a quality indication greater than a predetermined threshold, and for outputting an error mitigated signal, said error mitigator additionally comprising a bit value adjuster, operable for adjusting each bit of the first group of symbols, based on a bit value of each said bit, to one of plural predetermined values when the QI signal is less than the predetermined threshold and e) an ADPCM decoder coupled to the error mitigator.

20. The receiver of claim 19 wherein each bit of the first group of symbols is in hexadecimal format, and the bit value adjuster is further operable for substituting a value of "3" for each nibble having a hexadecimal value in the range "1" through "7" and substituting a value of "C" for each bit having a hexadecimal value in the range "8" through "E".

21. The receiver of claim 19 further comprising f) a differential phase detector coupled to the demodulator, operable for determining a differential phase of each symbol of a first group of symbols of the demodulated ADPCM signal; and wherein the error mitigator comprises:

i) a MSB detector coupled to the differential phase detector, comprising an input, a MSB value detector coupled to the input operable for determining plural closest constellation points to a first symbol containing a most significant bit (MSB) of the first group, and for determining whether the MSB has a same value when mapped to each of the plural closest constellation points, and a phase magnitude detector coupled to the input operable for determining whether a magnitude of the differential phase of the first group is within a threshold region;

ii) a soft correction unit coupled to the MSB detector, and demodulator, operable for retaining the MSB and further error mitigating all other bits of the first group of symbols when the magnitude of the differential phase of the other bits is within the threshold region and the MSB has the same value when mapped to each of the plural closest constellation points.

22. The receiver of claim 21 wherein the first group of symbols is a first ADPCM nibble, the MSB is a sign bit of the first nibble, the error detector is further operable for determining an error indication of a first frame of the demodulated ADPCM signal, the first frame containing the first ADPCM nibble, and further comprising:

an average magnitude detector coupled to the demodulator, operable for detecting the average magnitude of each nibble of a further frame which is a most recent frame prior to the first frame for which no error indication signal was generated, and dividing the average magnitude by $2_n$ (where n is a number of frames between the first frame and the further frame) to obtain a default magnitude; and wherein the soft correction unit is coupled to the average magnitude detector and is further operable for replacing the remaining bits of the first nibble with the default magnitude.

23. A method of error mitigating a signal, the method comprising the steps of:

determining a differential phase of each symbol of a first group of symbols of the signal;

determining whether a magnitude of the differential phase of the first group is within a threshold region;

determining plural closest constellation points to a first symbol containing a most significant bit (MSB) of the first group; and retaining the MSB and further error mitigating all remaining bits of the first group when the magnitude of the differential phase is within the threshold region and the MSB has the same value when mapped to each of the plural closest constellation points.

\* \* \* \* \*

UNITED STATES PATENT AND TRADEMARK OFFICE
CERTIFICATE OF CORRECTION

PATENT NO.   : 5,768,291
DATED        : June 16, 1998
INVENTOR(S)  : Kelton, et al.

It is certified that error appears in the above-indentified patent and that said Letters Patent is hereby corrected as shown below:

Column 8, line 42 reads "the remaining" should be --replacing the remaining--.

Column 8, line 59 reads "each bit" should be --each nibble--.

Column 9, line 54 reads "$2_n$" should be --$2^n$--.

Signed and Sealed this

Twenty-ninth Day of September, 1998

*Attest:*

BRUCE LEHMAN

*Attesting Officer*   *Commissioner of Patents and Trademarks*